Figure 1:
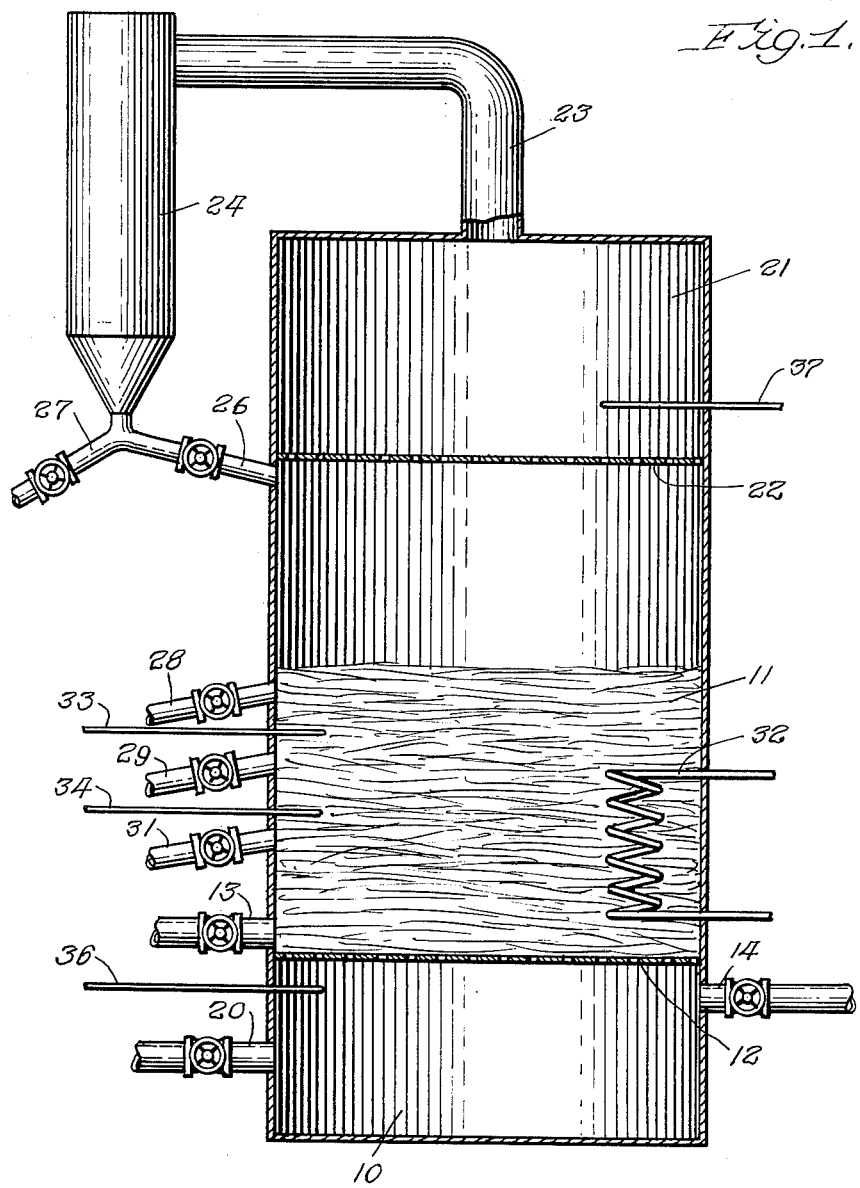

Feb. 12, 1963 G. I. KLEIN ETAL 3,077,382
METHOD FOR RECOVERING PHOSPHORIC ACID ANHYDRIDE
Filed April 11, 1960 3 Sheets-Sheet 1

Inventors.
George I. Klein,
Ralph E. Newby,
Leo B. Post,
By Merriam, Smith & Marshall, Attys.

Inventors:
George I. Klein
Ralph E. Newby
Leo B. Post
By Merriam, Smith & Marshall
Attorneys.

3,077,382
METHOD FOR RECOVERING PHOSPHORIC ACID ANHYDRIDE
George I. Klein, Park Forest, Ralph E. Newby, Steger, and Leo B. Post, Chicago, Ill., assignors to Stauffer Chemical Company, New York, N.Y., a corporation of Delaware
Filed Apr. 11, 1960, Ser. No. 21,499
8 Claims. (Cl. 23—165)

This invention relates to a spherical agglomerated form of hexagonal (i.e., monomeric) phosphoric acid anhydride and the method by which it is produced. More specifically, it relates to the condensation of sublimed phosphoric acid anhydride in a fluidized bed to produce uniquely shaped agglomerated particles of hexagonal phosphoric acid anhydride.

The commercial oxidation of elemental phosphorus results in the formation of a gaseous mixture containing, in addition to phosphoric acid anhydride ($P_2O_5$), the residue gases from the combustion air and any excess air used to insure complete combustion. Depending upon combustion conditions and control, $P_2O_5$ so produced will be in the vapor form and diffused in the gaseous stream or, usually at lower gas temperatures, in the form of ultrafine particles dispersed as a colloidal suspension in the combustion mixture.

Heretofore, one common industrial method for the recovery of $P_2O_5$ involved passing the combustion mixture over a cooled surface upon which the $P_2O_5$ would deposit. Another method consisted of passing the combustion mixture through large chambers or "barns" where it was sufficiently cooled to induce the build-up of suspended particles to a point where they would precipitate out as a "shower" of finely divided solids. Although these methods have been somewhat useful in commercial applications, they have important disadvantages, namely, extremely poor heat transfer, lack of process control, lump formation, and scale formation.

We have now discovered that sublimed phosphoric acid anhydride can be condensed in a fluidized bed, giving a more efficient and controllable method. By this invention a gaseous stream containing $P_2O_5$ is passed into a fluidized bed of $P_2O_5$ particles. The gaseous stream is sufficiently mixed and cooled therein to effect condensation of the $P_2O_5$ with the fluidized particles acting as nuclei for some of the condensing $P_2O_5$. Any residual noncondensing gases pass upward and out of the cooling zone impelled by a pressure gradient within the bed. Heat transfer apparatus, together with a suitable cooling fluid, may be used to maintain the desired condensing temperature of the fluidized mass. Under continuous, steady state operation, solid hexagonal $P_2O_5$ is withdrawn from the bed at about the same rate as the $P_2O_5$ entering the vapor, and so a substantially constant condensing bed is maintained.

On passing into the cooler, fluidized bed having high thermal conductivity and capacity, the hot gases cool to a temperature below the sublimation point of hexagonal $P_2O_5$. The fluidized particles having the same composition act as excellent nuclei upon which the $P_2O_5$ may solidify. Both cooling and condensation, therefore, are accomplished as the gases rise through the cooled fluidized bed. In order that the $P_2O_5$ gaseous stream will have sufficient contact time within the fluidized phase, it is usually passed thereinto at a point near the bottom of the bed. This also allows good mixing and dilution in the cooler fluidization gases, in cases where the bed is not fluidized with the $P_2O_5$ gaseous stream itself, tending to promote more uniform and rapid condensation. From a standpoint of operating efficiency it is more desirable to separately fluidize the bed with some other gas, e.g., dry air, nitrogen, or recycled gases, while passing the phosphoric acid anhydride stream directly into the fluidized bed. Nevertheless, it is possible and sometimes practical to fluidize the bed with the $P_2O_5$-containing stream itself. In either case, one passage through the bed is usually sufficient to condense all of the $P_2O_5$ contained in the gaseous stream.

A principal advantage of this invention is that it offers a method for condensing $P_2O_5$ which is not attended by scaling or lump formation. The product of this method is more desirable, therefore, and does not require subsequent milling or other treatment. Heat transfer surfaces, retention walls, and essentially all exposed surfaces in the cooling zone remain perfectly clean, obviating the heretofore frequent operational suspensions for cleanout purposes.

Another advantage is that the particles produced by the condensation technique of this invention have a unique and desirable spherical shape.

Still another advantage is the greatly diminished size of the apparatus required for an equivalent amount of production made possible by the improved efficiency, heat transfer, and process control of this invention.

From the standpoint of commercial desirability, the advantages of the invention over the methods heretofore known are many, including the advantages of automation, easier instrumentation, lower initial equipment costs, and decreased maintenance and supervision requirements.

Figure 2:
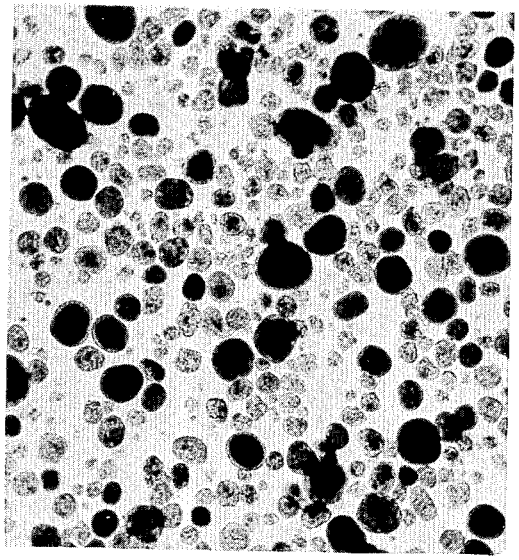
Figure 3:
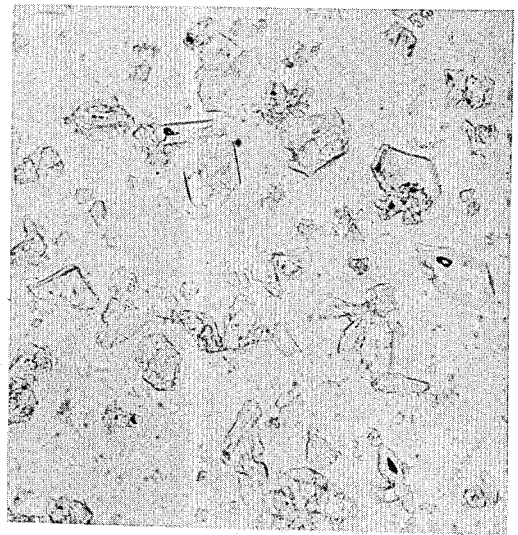
Figure 4:
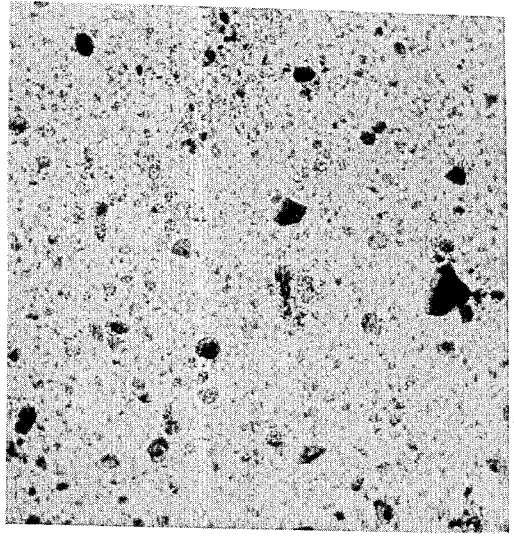
Figure 5:
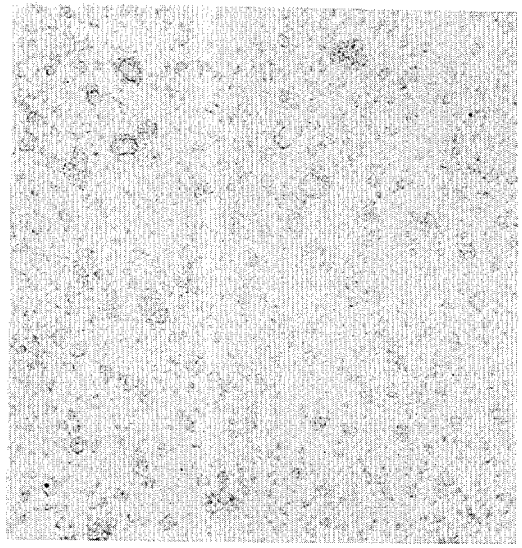

In the appended drawings:
FIGURE 1 shows a typical reactor which can be used for condensation by the method of the invention;
FIGURE 2 is a photomicrograph of particles of $P_2O_5$ manufactured by the method of this invention;
FIGURE 3 is a photomicrograph of a typical prior art form of hexagonal $P_2O_5$;
FIGURE 4 is a photomicrograph of the $P_2O_5$ of FIGURE 2 after being milled in a Raymond hammer mill equipped with a 0.02 inch screen; and
FIGURE 5 is a photomicrograph of the $P_2O_5$ of FIGURE 3 after being milled in a Raymond hammer mill equipped with a 0.02 inch screen.

Referring to FIGURE 1, the fluidization gases enter the windbox chamber 10 prior to their use for expanding the bed. The condensing zone of fluidized particles 11 is expanded by the uprising gases from subjacent windbox 10, said windbox being separated from the bed by a gas distributing bed plate 12. For a separately buoyed bed the $P_2O_5$ gas stream is supplied directly to the fluidized bed, usually at the bottom thereof, through conduit 13 and fluidizing gas is supplied to windbox 10 through conduit 14. When used to fluidize the bed the $P_2O_5$ stream is supplied through conduit 20 to the windbox 10 from which it rises through the system. Rising gases pass through the bed 11 into the supercontiguous freeboard or entrainment disengaging space 21 which may, when desirable, be separated from the bed by entrainment screen 22. Gases rising out of freeboard space 21 pass through conduit 23 to separator 24 where any entained particles are collected and either returned to the bed through conduit 26 or withdrawn from the process through conduit 27. When using internal bed cooling apparatus 32, it is desirable to employ vertical plates or coils through which the required amount of cooling fluid is circulated. Solid materials are conveniently withdrawn from the bed 11 at desired vertical locations through conduits 28, 29, and 31 within the condensing zone. Thermocouples 33, 34, 36, and 37 supply temperature information as desired.

The fluid bed 11 may succinctly described as a dense, turbulent, uniformly fluidized phase of cooled particles. When expanded to such a phase, $P_2O_5$ exhibits a bed density of about 35 to about 50 lbs./cu. ft. Condensation is not limited to a dense turbulent bed only; a quiescent, dilute, bubbling, slugging, or any homogeneous or nonhomogeneous bed can be used with some degree of efficiency. However, it is preferable to expand the bed as little as possible with the fluidization gases, commensurate with uniform total fluidization, mainly to prevent entrainment of the small particles or fog frequently formed when condensing sublimed $P_2O_5$. Good distribution of the fluidization gases as they rise through the bed plate 12 and enter the bed mass is also important. The lack of good distribution leads to uneven fluidization with localized quiescent zones where crustations and lumps may form. Nonuniform fluidization also leads to poor heat transfer between the bed mass and the cooling plates or coils.

In the practice of the invention it is desirable to initially charge the condensing zone with previously made $P_2O_5$ having about the same particle size distribution as the material to be produced. This pre-established bed may be expanded with a substantially dry fluidization gas to give the dense phase. Sufficient bed expansion is accomplished at fluidization gas velocities above about 0.4 ft./sec. Although the temperature of the fluidization gas need not be critically controlled, it is preferably maintained at or below the temperature of the fluidized bed. If gases at a higher temperature than the sublimation point of hexagonal $P_2O_5$ are used, there is a tendency to sublime or fuse materials which contact the bed plate 12.

An important alternate operating method comprises recycling the gases which pass out of the fluidized bed. These gases are suitably compressed and returned to the windbox, uprising therethrough into the bed where they serve as the fluidizing media. Recycling the residual gases allows much better control of the moisture present in the fluidized bed and also decreases $P_2O_5$ losses to the atmosphere. If, however, the gases are taken directly from the freeboard 21 to the windbox 10, without cooling in the interim, the heat transfer load on the bed cooling apparatus is rather high. Preferably, therefore, the gases enter an external cooler of suitable design, after passing through a dust collector or fines disengaging apparatus, if necessary, before being returned to the windbox. When desirable the recycled gas may be cooled sufficiently, by refrigeration or other means, to obviate entirely the need for cooling apparatus within the bed. Usually, the external gas cooler is employed to supplement the bed cooling apparatus, allowing higher capacity with a condenser unit of given size.

Because water vapor reacts rapidly with $P_2O_5$ to form the various acids of phosphorus, it is necessary to limit the amount of moisture present in the condensation system. When recycling gases from the bed to maintain fluidization, the moisture content in the system can be conveniently controlled by suitable dehumidification of the combustion air used for oxidation of the elemental phosphorus. Under such operation, it is preferable to use combustion air containing less than 5000 p.p.m. water vapor. Where used herein, "substantially dry conditions" and simply "dry" are intended to describe operations where the total moisture introduced into the fluidized bed system is less than 5000 p.p.m. of the combustion air, or its equivalent as introduced by other means. Higher humidities within the aforementioned limitation influence the particle growth and tend to narrow the extremes of particle size distribution.

The particle shape assumed by $P_2O_5$ as it condenses from the gaseous stream is an important feature of this invention. Phosphoric acid anhydride condenses in the fluidized bed in the form of spherical, agglomerated particles instead of the usual irregular hexagonal crystals. However, this phenomenon is limited to fluidized bed temperatures above 90° C. and below the condensation temperature of sublimed $P_2O_5$, i.e., about 365° C. at standard atmospheric pressure. At temperatures in this range the fluidized $P_2O_5$ solids appear tacky and slightly plastic which would seem to show that the unique shape of the product of this invention is due to either the transitition of $P_2O_5$ through a soft stage while condensing or a softening after condensation when held at an elevated temperature. Below 90° C., fluidized $P_2O_5$ does not appear to be tacky or plastic and when condensed at such temperatures the $P_2O_5$ forms into minute, somewhat irregular particles which are not as easily fluidized and do not have the characteristics of the higher temperature materials. Although less controllable, condensation at all temperatures below about 90° C. is possible and has substantially all the advantages of the method of the invention with the exception of the preferred product. At bed temperatures above about 175° C. tackiness is so pronounced that the bed becomes susceptible to fusion as a spongy mass. Effective fluidization above 175° C., therefore, requires suitable bed agitation, high fluidization gas velocity, a very dry condensing system, or a combination of these factors for continuous and satisfactory operation. Because of these factors the preferred range of bed temperatures for smooth continuous condensation to the desirable spherical agglomerated particles is about 90° C. to about 175° C.

The size of the particles which will be produced is dependent to some extent upon the bed temperature when operating within the range of about 90° C. to about 175° C. Higher temperatures within this range are consistent with larger particles, while lower temperatures tend to result in the production of smaller particles. Differences in the particle size, and to some extent the size distribution, can be observed between products produced at bed temperature only 5–10° C. apart. Combined with the controlling effects of humidity changes, temperature control can be used to manufacture the spherical $P_2O_5$ in a great many distinguishably different sizes and having various modifications of size distribution. The preferred product of this invention can be produced as microspherical as well as larger spherical particles.

The advantages to be gained from operating under high superatmospheric pressure or vacuum are not considered sufficient to justify the increased control problems which arise therefrom. However, normal operation requires a slight pressure in the system. When fluidizing with recycled gases the pressure, if desired, may be varied over a wide range. A shift in the preferred temperature range would be predictable for such operations and therefore where given herein the preferred temperatures are those which can be used for condensation at near-atmospheric pressure. Shifts in the preferred temperature range may be roughly approximated from vapor pressure data when it is desirable to operate at high pressure or vacuum.

There is no apparent limitation as to the size of a fluidized bed which can be used in the practice of this invention, at least with regard to bed diameter. With regard to bed height we have found that the factor which controls the completeness of condensation is the amount of time the uprising $P_2O_5$ stream is retained within the cool bed, and therefore, a higher bed would be necessary for a fast-rising stream while a shallow bed is all that may be required for a slow-rising stream. There are other practical considerations, however, and bed design is somewhat dependent upon the distribution of the sublimed $P_2O_5$, amount and type of internal heat transfer apparatus, the condensing temperature to be used, etc. A bed having a 2 ft. diameter and 3 ft. height has been found adequate to condense in a single pass substantially all of the $P_2O_5$ contained in a gaseous stream uprising through the bed at a velocity of about 0.5 ft./sec.

In continuous operation the desired condensing temperature, once established, is thereafter maintained substantially constant by controlling the circulation rate of the cooling fluid. Cooling plates or coils, suitable internal heat exchange apparatus for this invention, usually attain an over-all heat transfer coefficient of about 25 to about 50 B.t.u./hr./°F./ft.$^2$, although higher values have been observed. A bed-section jacket, however, gives a lower coefficient of about 15 to about 40 B.t.u./hr./°F./ft.$^2$. By way of comparison, the prior art "barns" or towers typically give a coefficient of about 4 to about 8 B.t.u./hr./°F./ft.$^2$. Even so, the decrease in the condenser size requirements by the method of the invention is greater than what would be expected from a six-fold increase in heat transfer rate alone. It is well to note, therefore, that the heat transfer apparatus which is preferred by this invention offers greater surface area for a smaller volume of equipment, not requiring the transfer of heat through retention walls as in the old methods.

Very rapid heat transfer between the fluidized mass and the uprising $P_2O_5$ vapors makes the maximum condensation capacity by this method highly dependent on the heat transfer surface area of the internal cooling apparatus, the amount of external gas cooling, and the cooling medium temperature. The fluidized bed can, of course, be filled with a number of plates or coils until the desired heat transfer surface area is obtained, limited only by the physical dimensions of the bed. For these reasons, there is no precise limitations as to the condensation capacity of a certain sized bed. However, a bed cooled only by internal cooling plates of moderate surface area and employing water as the cooling medium has been found to condense $P_2O_5$ at the rate of about 4–12 lbs./hr./cu. ft. of bed volume. The prior art "barns" or towers gave typical condensation rates of about 0.1 to about 0.3 lb./hr./cu. ft. of condenser volume.

The preferred product of the method of this invention has many commercially desirable characteristics. This material has a higher density, different particle shape, different particle size distribution, and more desirable handling characteristics than the material of the prior art.

In the accompanying drawings, FIGURES 2–5 are photomicrographs showing the distinguishing visual features of the preferred product produced by the invention. All these photomicrographs were made at a magnification of about 160× and with the same intensity of light passing up through the test slides.

As shown in the photomicrographs, the $P_2O_5$ produced by this invention is composed of somewhat opaque spherical particles which appear upon close examination to be made up of extremely small hexagonal crystals. By comparison, they are far more opaque than the prior art crystals and show a very small number of fusions between larger agglomerates. Higher opacity, while somewhat dependent on size and shape of the particles, appears to be inherent with the agglomerated $P_2O_5$. This can be seen from a comparison of FIGURES 4 and 5 which show samples of the prior art material and the new material after being milled to about the same degree of fineness. Ostensibly, fluidization produced particles are composed of individually clear hexagonal crystals like those of FIGURE 3 but of much smaller size. The spherical particles of the new material consist of an agglomeration of a great many of the smaller crystals produced by a mechanism which allows random irregularities at the interfaces where the condensing material attaches to the seed particle. It appears that this results in the refraction and dispersion of light passing through the particles, making them appear to be opaque upon microscopic examination.

Although microspherically sized $P_2O_5$ is of particular commercial importance, much larger spherical particles are also useful for certain applications typically as mixtures having at least 50% by weight of particles with diameters greater than 350 microns. Larger particles may be desirable in various dehydrating operations and for use as catalysts. The microspherical agglomerated $P_2O_5$, such as shown in FIGURE 2, is typically composed of at least 90% by weight of particles smaller than 350 microns in diameter. The very smallest particles of such product have diameters as low as about 10 microns, while the average particle size is usually within the range of about 40 to about 100 microns. FIGURE 2 also shows that the particles of microspherical $P_2O_5$ are not usually perfect spheres, but rather have a tendency to be oblong or drop-like in shape, this being also a characteristic of much larger sized spherical particles. However, for ease of discussion the particles will be referred to herein as either "spherical" or "microspherical," the former term being applicable to all sizes while the latter is used to describe only the very fine particles below 350 microns in diameter. Where particle size is described herein in terms of the diameter of such particles, this diameter is meant to be an average value calculated as the arithmetic average of the smallest and the largest diameter of the particular particle.

FIGURE 2 shows a particularly advantageous size and size distribution for particles of $P_2O_5$. The invention is not restricted thereto, however, since spherical particles having different ranges of size distribution and/or larger or smaller diameters can be produced. Particles of this new $P_2O_5$ are mainly solid and have a chemical composition essentially identical to the prior art materials although they do not always exhibit the same characteristics. Analysis of the new material shows it to be about 99.6% to about 99.9% $P_2O_5$. Nevertheless, it has been found that microspherical hexagonal form $P_2O_5$ produced by the method of this invention reacts more controllably than regular hexagonal shaped crystals of $P_2O_5$. Its reactivity has been found to be intermediate between the fast-reacting hexagonal material of the prior art and the slower orthorhombic form of $P_2O_5$.

Microspherical $P_2O_5$ and the known hexagonal material were tested for reactivity with 2-ethyl hexanol by measuring the rate of temperature rise after contacting $P_2O_5$ with the reacting alcohol. The average size of the $P_2O_5$ particles in all of the samples tested was essentially the same. The procedure involved charging a Dewar flask with 150 ml. of dry xylol to which was added exactly 20 grams of the $P_2O_5$ to be tested. A stirrer was allowed to run for about 1 minute until the $P_2O_5$ was well dispersed and the temperature became constant. Then 100 ml. of 2-ethyl hexanol was added as quickly as possible, after which the temperature rose in all cases a total of 38–40° C. The time interval between the 5° C. and 30° C. rise was recorded and divided into 25 to give the reactivity index of the sample tested. For comparative purposes, samples of the prior art hexagonal $P_2O_5$ produced by several commercial manufacturers were tested. The results are given in the following table.

TABLE I

| Sample: | Reactivity index, ° C./sec. |
|---|---|
| Prior art hexagonal $P_2O_5$— | |
| Manufacturer A | 2.91 |
| Manufacturer B | 1.30 |
| Manufacturer C, sample 1 | 2.06 |
| Manufacturer C, sample 2 | 1.79 |
| Manufacturer C, sample 3 | 1.92 |
| Spherical hexagonal $P_2O_5$ of this invention— | |
| Sample 1 | 0.59 |
| Sample 2 | 0.72 |
| Sample 3 | 0.86 |
| Sample 4 | 0.94 |
| Sample 5 | 0.85 |

The inherently slow reactivity is an important characteristic of the hexagonal $P_2O_5$ of this invention which must be considered in chemical reactions, especially with organic reactions where close temperature control is necessary. Various organic synthesis reactions are more smoothly accomplished with a slower reacting $P_2O_5$, but need not proceed so slowly as to require orthorhombic $P_2O_5$. On a commercial production scale where desirable heat transfer rates would be exceeded by the use of the prior art $P_2O_5$ in a particular reaction, microspherical $P_2O_5$ can be used to control the rate at which heat is liberated.

Other desirable characteristics have been found which are due mainly to the physical form of this new $P_2O_5$. When used as a catalyst, $P_2O_5$ is often immersed in a heavy oil carrier or other viscous fluid. In many cases where the prior art material would tend to float on the surface or form lumps when added to a chemical solution or a viscous fluid, microspherical $P_2O_5$ will immerse more rapidly and will not form lumps. Lumping is quite common with ordinary $P_2O_5$ when used in some organic chemical reaction, and is thought to be due mainly to the presence of a great amount of small particles.

Phosphoric acid anhydride produced by the method of this invention has a higher bulk density than the ordinary hexagonal form. The following Table II is a comparison of spherical shaped $P_2O_5$ and the prior art materials.

TABLE II

| Sample | Density (Loose), gm./ml. | Density (Packed), gm./ml. |
| --- | --- | --- |
| Prior art hexagonal $P_2O_5$, Sample 1 | 0.96 | 1.25 |
| Prior art hexagonal $P_2O_5$, Sample 2 | 0.70 | 1.08 |
| Spherical hexagonal $P_2O_5$ of this invention: | | |
| Sample 1 | 1.34 | 1.52 |
| Sample 2 | 1.26 | 1.42 |
| Sample 3 | 1.24 | 1.50 |
| Sample 4 | 1.20 | 1.45 |

The product of this invention typically has bulk densities above 60 lbs./cu. ft. being usually within the range of about 65 to about 85 lbs. compared to about 55 to about 65 lbs./cu. ft. for the prior art material. Where mentioned herein without qualification, "bulky density" is meant to refer to loose bulk density. For such density measurement, $P_2O_5$ is simply poured into a graduated container without being compacted or compressed in any manner. Even at the higher densities the new material is substantially free-flowing and less susceptible to caking. Both the high density and free-flowing quality of this new material are desirable improvements in the handling characteristics of $P_2O_5$. The $P_2O_5$ of the invention can be packed into a given container in larger quantities, in many cases as much as 40% more by weight, and, when removed from the container for use, is even more free-flowing than would be the loosely packed prior art $P_2O_5$. Because of its small fines content, the new $P_2O_5$ does not dust or cake as readily as the old material. Obviously, the spherical $P_2O_5$ having been shaped to some extent by the effects of fluidization is very easily fluidized, as contrasted to prior art hexagonal $P_2O_5$ which is difficult to fluidize. When used commercially as a fluidized catalyst for vapor phase reactions, spherical $P_2O_5$ is quickly and effectively fluidized to give a very desirable dense bed. There are many other advantages of the new material which may be traced to its unique shape, size distribution, etc., and these will be obvious to those familiar with the art.

The method of this invention has its major use in the recovery of sublimed $P_2O_5$ from vapor mixtures formed by the oxidation of elemental phosphorus. However, the technique is also applicable with substantially the same advantages to heat polishing of $P_2O_5$ solids or recovery of sublimed or resembed $P_2O_5$ vapors from sources other than the oxidation of elemental phosphorus.

The method of the invention is illustrated in the following examples.

*Example I*

The method of this invention was applied to the condensation of phosphoric acid anhydride vapors produced by the oxidation of elemental phosphorus in dry air. An apparatus similar to that shown in FIGURE 1, except for entrainment screen 22, was used. The heat exchange apparatus consisted of two flat plate coils, positioned vertically in the bed section to face each other and partially divide the bed into compartments of about equal volume. A pre-established bed of granular phosphoric acid anhydride, made in the same apparatus by a previous run, was expanded to a bed density of about 40 lbs./cu. ft. The bed was fluidized by passing dried air therethrough at a velocity of about 0.6 ft./sec. Phosphoric acid anhydride vapor was produced by the oxidation of elemental phosphorus in a nearby combustion chamber. The air used for oxidation contained 11–170 p.p.m. water vapor, and was supplied in an amount of 118% in excess of that theoretically required for complete combustion. So produced, the combustion mixture was transported by conduit to the interior of the fluidized bed near the bottom where it entered at a temperature of about 510°–570° C. Water was circulated through the cooling plates, the rate being adjusted to give a bed temperature of 129°±1° C. Under these conditions condensation was continued for many hours. A constant flow of $P_2O_5$ vapor was maintained and solids were withdrawn at about an equivalent rate. At the termination of the run the walls and cooling surfaces in the fluidization chamber were found to be perfectly clean and free from scale. The over-all production rate was found to be about 5 lbs./hr./cu.ft. of fluidized bed volume. The product was a free-flowing and virtually dustless form of monomeric or hexagonal $P_2O_5$, being in the shape of small spheres or beads. The bulk density of this material was found to range about 67–74 lbs./cu.ft.

*Example II*

Using substantially the same apparatus and method as Example I a run was accomplished at a bed temperature of 130°–140° C. The condensation rate was calculated to be about 5.6 lbs./hr./cu.ft. of bed volume.

*Example III*

Using substantially the same apparatus and method as Example I a run was accomplished at a bed temperature of 80°–90° C. The condensation rate was calculated to be about 4.5 lbs./hr./cu.ft. of bed colume.

*Example IV*

Using substantially the same apparatus and method as Example I a run was accomplished at a bed temperature of 140°–145° C. Continuous condensation was performed for 36 hours during which time the hexagonal $P_2O_5$ particles were intermittently removed from the bottom of the fluidized bed. Samples taken of the product showed a bulk density of 77–80 lbs./cu.ft. The condensation rate was calculated to be 4.5 lbs./hr./cu.ft of bed volume.

The method of condensation described herein equally applicable to $P_2O_5$ whether diffused as a true vapor or dispersed as a colloidal suspension in the gaseous stream. Furthermore, since the method of condensation is essentially the same in both cases, no distinction should be construed from the use herein of the term "sublimed," which is intended to cover both instances.

The foregoing detailed description has been given for clearness of understanding only, and no unnecessary limitations should be understood therefrom, as modifications will be obvious to those skilled in the art.

What is claimed is:

1. A method for condensing a hot gaseous stream of sublimed phosphoric acid anhydride comprising passing said hot stream through a fluidized bed of monomeric $P_2O_5$ particles maintained at a temperature within the range of about 90°–365° C. whereby the sublimed $P_2O_5$ is condensed to a particulate monomeric form, said gaseous stream being introduced into said bed at a depth for which the time of passage for said gas from there to the surface of the bed exceeds the time necessary to condense the $P_2O_5$ in the gas.

2. A method for condensing sublimed phosphoric acid anhydride in the form of microspherical agglomerated particles which comprises passing a hot gas containing sublimed $P_2O_5$ through a dense turbulent fluidized bed of monomeric $P_2O_5$ particles maintained at a temperature within the range of about 90° C. to about 175° C. whereby the sublimed $P_2O_5$ is condensed to a particulate monomeric form, said hot gas being introduced into said bed at a depth for which the time of passage for said gas from there to the surface of the bed exceeds the time necessary to condense $P_2O_5$ from the gas.

3. A method for condensing a hot gaseous stream of sublimed phosphoric acid anhydride comprising the oxidation products of elemental phosphorus in substantially dry air which comprises passing said hot stream through a fluidized bed of monomeric $P_2O_5$ particles maintained at a temperature below about 365° C. whereby the sublimed $P_2O_5$ is condensed to a particulate monomeric form, said gaseous stream being introduced into said bed at a depth for which the time of passage for said gas from there to the surface of the bed exceeds the time necessary to condense $P_2O_5$ from the gas.

4. A method for condensing a hot gaseous stream of sublimed phosphoric acid anhydride in the form of microspherical agglomerated particles, said hot gaseous stream comprising the oxidation products of elemental phosphorus in substantially dry air, which comprises passing said hot gaseous stream through a dense turbulent fluidized bed of monomeric $P_2O_5$ particles maintained at a temperature within the range of about 90° C. to about 175° C. whereby the sublimed $P_2O_5$ is condensed to a particulate monomeric form, said gaseous stream being introduced into said bed at a depth for which the time of passage for said gas from there to the surface of the bed exceeds the time necessary to condense $P_2O_5$ from the gas.

5. The method of claim 4 wherein the monomeric $P_2O_5$ particles are fluidized at least partially by gases recirculated from said fluidized bed.

6. The method of claim 4 wherein sublimed $P_2O_5$ is continuously introduced into the fluidized bed while particles of monomeric $P_2O_5$ are withdrawn from the bed at a substantially equivalent rate.

7. The method set forth in claim 4 and comprising controlling the temperature of said fluidized bed, said temperature controlling step including introducing externally cooled fluidization gases thereinto.

8. Monomeric phosphoric acid anhydride of substantially opaque, free-flowing, agglomerated spherical particles produced by a method which comprises passing a hot gaseous stream having sublimed phosphoric acid anhydride through a fluidized bed of monomeric $P_2O_5$ particles maintained at a temperature within the range of about 90°–365° C. whereby the sublimed $P_2O_5$ is condensed to a particulate monomeric form, said gaseous stream being introduced into said bed at a depth for which the time of passage for said gas from there to the surface of the bed exceeds the time necessary to condense the $P_2O_5$ in the gas.

References Cited in the file of this patent

UNITED STATES PATENTS

| | | |
|---|---|---|
| 2,907,635 | Tucker | Oct. 6, 1959 |
| 2,988,426 | Cross et al. | June 13, 1961 |

OTHER REFERENCES

Phosphorus and Its Compounds, Van Wazer, vol. 1, Chemistry, Interscience, 1958, specifically pages 267–276.